M. F. STOLBERG.
TIRE INFLATING APPARATUS.
APPLICATION FILED AUG. 24, 1911.

1,028,628.

Patented June 4, 1912.

WITNESSES:
C. H. Bills
E. E. Thomas

INVENTOR.
Mason F. Stolberg,
By Owen & Owen,
His attys.

BEST AVAILABLE COPY

UNITED STATES PATENT OFFICE.

MASON F. STOLBERG, OF TOLEDO, OHIO.

TIRE-INFLATING APPARATUS.

1,028,628.  Specification of Letters Patent.  Patented June 4, 1912.

Application filed August 24, 1911. Serial No. 645,892.

*To all whom it may concern:*

Be it known that I, MASON F. STOLBERG, a citizen of the United States, and a resident of Toledo, in the county of Lucas and State of Ohio, have invented a certain new and useful Tire-Inflating Apparatus; and I hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is the provision of improved, simple and efficient means which is capable of being easily and quickly attached to or detached from an automobile or other self-propelled vehicle whereby the tires may be inflated by power from the engine of the vehicle through the medium of one of the drive wheels.

The invention is fully described in the following specification, and while, in its broader aspect, it is capable of embodiment in numerous forms, a preferred embodiment thereof is illustrated in the accompanying drawings, in which,—

Figure 1:
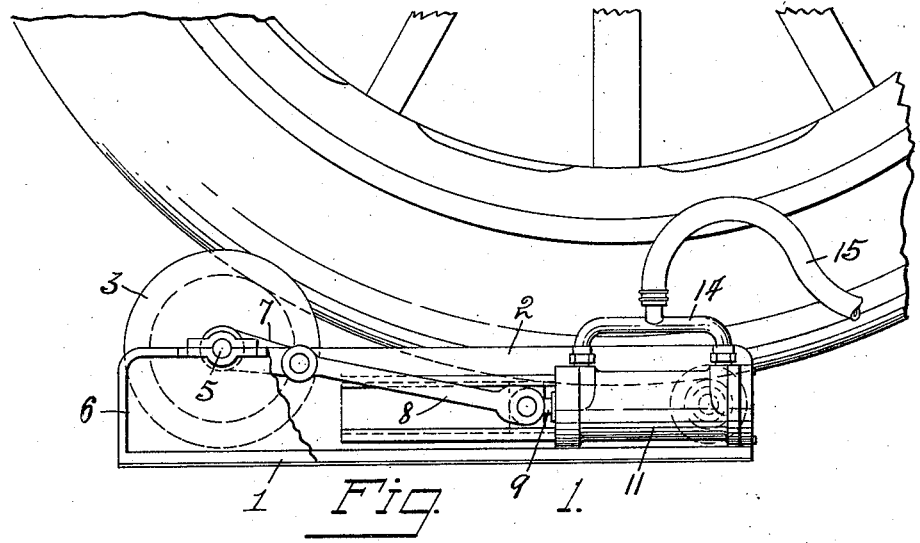
Figure 2:
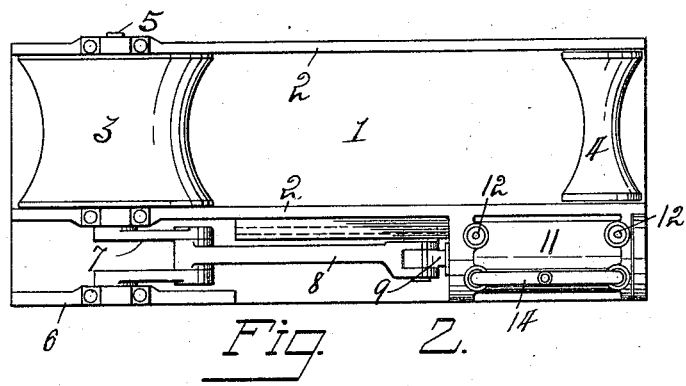
Figures 3, 4:
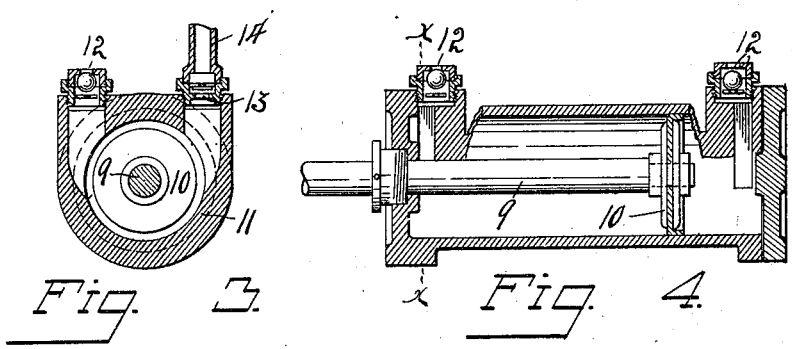

Figure 1 is a side elevation of an apparatus embodying my invention partly broken away and in driving engagement with a wheel. Fig. 2 is a plan view of such apparatus. Fig. 3 is an enlarged cross-section of the pump on the line $x\ x$ in Fig. 4, and Fig. 4 is a longitudinal section thereof.

Referring to the drawings, 1 designates a portable base or frame having sides or flanges 2 rising therefrom longitudinally thereof and forming bearings for the shafts or trunnions of a pair of wheel supporting rolls 3 and 4. These rolls are spaced apart longitudinally of the frame and are peripherally concaved to fit the tread portion of the customary automobile tire, and the roll 3, which is intended to serve as the drive roll of the pair, is preferably of greater diameter than the idler roll 4, as shown.

One end of the shaft 5 of the roll 3 is extended beyond the bearing flange 2 in which it is journaled, and is journaled without such flange in a bearing 6 rising from the base or frame 1. The portion of the shaft intermediate said bearings is provided with a crank 7, the wrist-pin of which is connected by a pitman 8 to a piston-rod 9, the piston 10 of which works within a pump cylinder 11. This pump cylinder is mounted on the frame 1 at the end of the roll 4, and is shown in the present instance as having each end provided with a valved air-inlet 12 and a valved air-outlet 13 to form a double-acting pump. The air-outlets 13 have communication through a branch pipe 14 with a common flexible tube 15 adapted to lead to any wheel of an associated automobile for the purpose of inflating the tire of such wheel by an operation of the pump.

The inner flange 2 is provided along its outer face with a guideway 16 in which the cross-head of the pump piston rod 9 slides.

It is evident that to pump up a tire of an automobile it is only necessary to jack up one of the drive wheels thereof to permit the placing of my pumping apparatus thereunder in position for such wheel to rest upon the rolls 3—4, as shown in Fig. 1. Upon a starting of the engine the driving of the wheel in engagement with the pumping apparatus will effect a driving of the roll 3 and a consequent working of the pump piston through the medium of the crank 7, pitman 8 and piston-rod 9, thus operating the pump to force air through the tube 15 into the tire to which it is attached.

It is apparent that I have provided a simple and efficient apparatus for the pumping up of automobile tires, which apparatus can be packed under a seat of an automobile or in some other convenient place therein, and is capable of being easily and quickly placed in driving engagement with the drive wheel of the vehicle or detached therefrom.

I wish it understood that my invention is not limited to any specific construction or arrangement of the parts except in so far as such limitations are specified in the claim.

Having thus described my invention, what I claim as new, and desire to secure by Letters Patent, is,—

In an apparatus of the type set forth, a base, a pair of vertical spaced flanges carried by the base and extending longitudinally thereof, one of the flanges being arranged flush with one side of the base and the other flange being spaced from the opposite side of the base, a third short flange at one end of the base disposed flush with the last named side of the base, said third flange being formed with a bearing intermediate of its ends and on its top face, a shaft journaled in said pair of flanges and in the bearing of the third flange and having a crank that is located in the space between the third flange and the inner flange of the pair of flanges, a pump carried by the base at the end thereof opposite to said third flange, a pitman connected to the crank and to the pump piston, and a longitudinal guide-way carried by the inner flange of the pair of flanges to slidingly receive the cross-head of the pump.

In testimony whereof, I have hereunto signed my name to this specification in the presence of two subscribing witnesses.

MASON F. STOLBERG.

Witnesses:
C. W. OWEN,
E. E. THOMAS.

Copies of this patent may be obtained for five cents each, by addressing the "Commissioner of Patents, Washington, D. C."